(12) United States Patent
Yegin et al.

(10) Patent No.: US 7,720,434 B2
(45) Date of Patent: *May 18, 2010

(54) METHOD AND SYSTEM FOR PROCESSING GPS AND SATELLITE DIGITAL RADIO SIGNALS USING A SHARED LNA

(75) Inventors: Korkut Yegin, Grand Blanc, MI (US); Nazar F. Bally, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/546,637

(22) Filed: Oct. 12, 2006

(65) Prior Publication Data

US 2008/0090514 A1 Apr. 17, 2008

(51) Int. Cl.
H04H 1/00 (2006.01)
(52) U.S. Cl. .................. 455/3.02; 455/13.3; 343/713; 701/213
(58) Field of Classification Search .................. 455/3.02
See application file for complete search history.

(56) References Cited

U.S. PATENT DOCUMENTS

| | | | | | |
|---|---|---|---|---|---|
| 5,995,814 | A | * | 11/1999 | Yeh | 455/180.1 |
| 6,538,609 | B2 | * | 3/2003 | Nguyen et al. | 343/713 |
| 7,129,895 | B2 | * | 10/2006 | Morris et al. | 343/700 MS |
| 7,587,183 | B2 | * | 9/2009 | Duzdar et al. | 455/136 |
| 2002/0008667 | A1 | * | 1/2002 | Nguyen et al. | 343/715 |
| 2002/0173337 | A1 | * | 11/2002 | Hajimiri et al. | 455/552 |
| 2004/0072575 | A1 | | 4/2004 | Young et al. | |
| 2005/0259017 | A1 | * | 11/2005 | Yegin et al. | 343/728 |
| 2006/0046639 | A1 | * | 3/2006 | Walker et al. | 455/3.02 |
| 2006/0062580 | A1 | * | 3/2006 | Mahbobi | 398/116 |
| 2006/0064725 | A1 | * | 3/2006 | Rabinowitz et al. | 725/68 |
| 2006/0067262 | A1 | * | 3/2006 | Troemel | 370/312 |
| 2006/0103581 | A1 | * | 5/2006 | Morris et al. | 343/715 |
| 2006/0176215 | A1 | | 8/2006 | Dubash et al. | |
| 2006/0189309 | A1 | * | 8/2006 | Good et al. | 455/427 |
| 2006/0205359 | A1 | * | 9/2006 | Brooks | 455/73 |

(Continued)

FOREIGN PATENT DOCUMENTS

EP 0 886 384 12/1998

(Continued)

OTHER PUBLICATIONS

European Search Report dated Nov. 4, 2008.

(Continued)

*Primary Examiner*—Duc Nguyen
*Assistant Examiner*—Hai V Nguyen
(74) *Attorney, Agent, or Firm*—Jimmy L. Funke

(57) ABSTRACT

A system for amplifying GPS and satellite digital radio signals is provided. The system includes a GPS antenna configured to receive signals transmitted by a GPS satellite, and a satellite digital radio antenna configured to receive satellite digital radio signals. The system also includes an amplifier that is electrically coupled to the GPS antenna and satellite antenna. The amplifier is configured to amplify GPS and satellite digital radio signals received by the satellite digital radio antenna and GPS antenna. A method for amplifying GPS and satellite digital radio signals is also provided.

2 Claims, 4 Drawing Sheets

U.S. PATENT DOCUMENTS

| | | |
|---|---|---|
| 2006/0220970 A1* | 10/2006 | Aminzadeh et al. .......... 343/713 |
| 2007/0053450 A1* | 3/2007 | Walker et al. ................ 375/260 |
| 2007/0216495 A1* | 9/2007 | Callewaert ................... 333/134 |
| 2008/0090514 A1* | 4/2008 | Yegin et al. ................. 455/3.02 |
| 2008/0146176 A1* | 6/2008 | Duzdar et al. ................ 455/136 |
| 2008/0268773 A1* | 10/2008 | Kesling et al. ............. 455/3.06 |

FOREIGN PATENT DOCUMENTS

| | | |
|---|---|---|
| EP | 1657784 | 5/2006 |
| WO | 00/03491 | 1/2000 |

OTHER PUBLICATIONS

Govind V. et al: "Design of multiband baluns on liquid crystalline polymer (LCP) based substrates", Electronic Components and Technology, 2004. ECTC 2004. Proceedings Las Vegas, NV, USA Jun. 1-4, 2004. ISBN9780780383654 (pp. 1812-1818.).

Hossein Hashemi, et al.: "Concurrent Multiband Low-Noise Amplifiers-Theory, Design, and Applications", IEEE Transactions on Microwave Theory and Techniques, IEEE Service Center, Piscataway, NJ, US. ISSN: 00189480 (pp. 288-301), Jan. 2002.

EP Search Report dated Jan. 19, 2009.

* cited by examiner

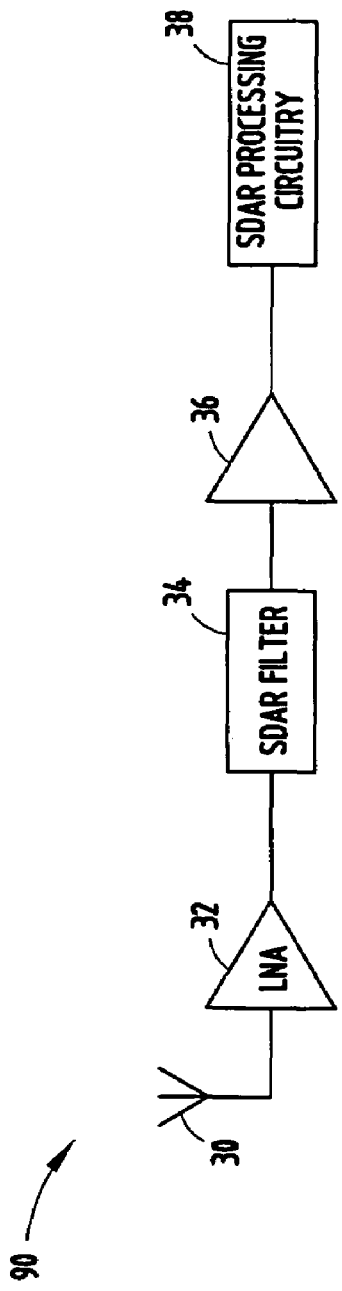
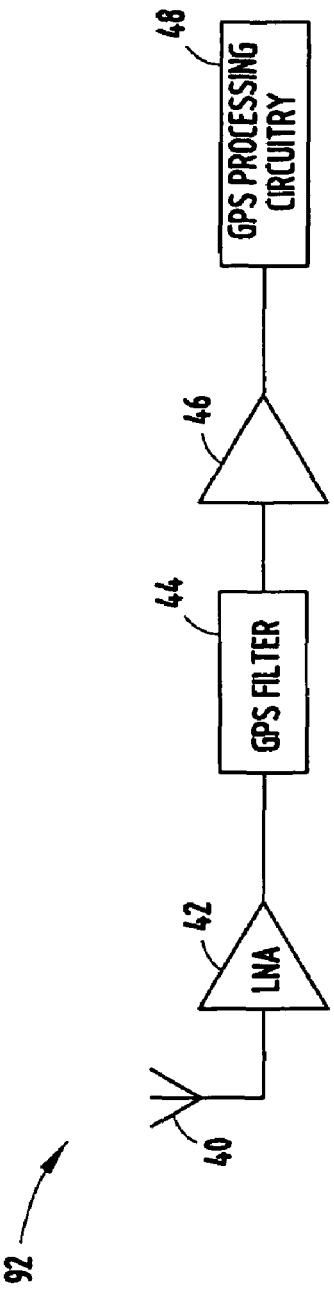
FIG. 1A
PRIOR ART
FIG. 1B
PRIOR ART

METHOD AND SYSTEM FOR PROCESSING GPS AND SATELLITE DIGITAL RADIO SIGNALS USING A SHARED LNA

TECHNICAL FIELD

The present invention relates generally to the processing of RF signals, and more specifically, to the amplification of GPS and satellite digital radio signals received by vehicle antennas using a low noise amplifier (LNA).

BACKGROUND OF THE INVENTION

Trucks, boats, automobiles and other vehicles are commonly equipped with various signal communication devices such as radios for receiving broadcast radio frequency (RF) signals, processing the RF signals, and broadcasting audio information to passengers. Satellite digital audio radio (SDAR) services have become increasingly popular, offering digital radio service covering large geographic areas, such as North America. Other geographic areas, such as Europe, are also beginning to offer SDAR services. These services typically receive uplinked programming which, in turn, is provided to subscriber RF receivers via satellites or terrestrial receivers. Each subscriber to the service generally possesses a digital radio having an RF receiver and one or more antennas for receiving the digital broadcast and providing it to receivers coupled to the one or more antennas. When a digital broadcast signal is received by an antenna, it is typically amplified in a low-noise amplifier coupled to the antenna prior to being provided to additional processing circuitry in the receiver for decoding. This amplification process typically improves the quality of the received signal provided to the additional processing circuitry.

FIG. 1A generally illustrates one example of a conventional satellite digital audio radio system 90. In this system 90, satellite digital audio radio signals are received by an antenna 30. The received signals are amplified by a low-noise amplifier 32, filtered by a filter 34, and further amplified by amplifier 36 prior to being provided to SDAR processing circuitry 38. The received, amplified, and filtered satellite digital audio radio signals are further processed by SDAR processing circuitry 38 to extract audio and/or other data.

Global Positioning System (GPS) receivers are also becoming increasingly popular as vehicle accessories. GPS receivers are typically employed in systems to help vehicle drivers and/or passengers determine their location and navigate to various locations. GPS receivers typically receive signals from multiple satellites via an antenna or multiple antennas. By receiving signals from multiple satellites, the GPS receiver is able to determine the location of the GPS receiver, and therefore the vehicle in which the receiver is located, based on the received GPS signals. As with SDAR signals, the GPS signals received by a GPS antenna are typically amplified by a low-noise amplifier coupled to the antenna prior to being provided to additional processing circuitry in the GPS receiver for the calculation of GPS information. This amplification process typically improves the quality of the signal provided to the processing circuitry of the GPS receiver.

FIG. 1B generally illustrates one example of a conventional GPS system 92 for processing GPS signals. In this system 92, GPS signals are received by an antenna 40, amplified by a low-noise amplifier 42, filtered by a filter 44, and amplified again by an amplifier 46 prior to being provided to GPS processing circuitry 48. GPS processing circuitry 48 utilizes the amplified, filtered GPS signals to determine location information.

When both a conventional GPS system 92 and a conventional satellite digital audio radio system 90 are employed in the same vehicle, each of the systems typically requires its own low-noise amplifier (LNA) for amplifying the received GPS and SDAR signals, respectively. The requirement that each system have its own LNA increases the size of the systems and increases the total system cost.

What is needed is a system and method for cost-effectively amplifying both GPS and SDAR signals received by vehicle antennas.

SUMMARY OF THE INVENTION

In accordance with one aspect of the present invention, a system for processing GPS and satellite digital radio signals is provided. The system includes a GPS antenna configured to receive signals transmitted by a GPS satellite, and a satellite digital radio antenna configured to receive satellite digital radio signals. The system also includes an amplifier that is electrically coupled to the GPS antenna and satellite antenna. The amplifier is configured to amplify GPS and satellite digital radio signals received by the satellite digital radio antenna and GPS antenna.

In accordance with yet another aspect of the present invention, a system for processing GPS and satellite digital radio signals is provided. The system includes an antenna configured to receive signals transmitted by both GPS satellites and satellite digital radio satellites. The system also includes an amplifier that is electrically coupled to the antenna. The amplifier is configured to amplify both GPS signals and digital satellite radio signals.

In accordance with still another aspect of the present invention, a method for processing GPS and satellite digital radio signals is provided. The method includes the steps of receiving GPS and satellite digital radio signals, providing the received signals to an amplifier circuit, and amplifying the received signals in the amplifier circuit. The method further includes the steps of providing the amplified signal to both a first filter for removing signal components other than GPS components to provide a filtered GPS signal, and a second filter for removing signal components other than satellite digital radio components to provide a filtered satellite digital radio signal. The method further includes the steps of providing the filtered GPS signal to GPS processing circuitry, and providing the filtered satellite digital radio signal to satellite digital radio signal processing circuitry.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1A is a block diagram generally illustrating a typical satellite digital receiver system;

FIG. 1B is a block diagram generally illustrating a typical GPS receiver system;

DESCRIPTION OF THE PREFERRED EMBODIMENTS

Figure 2:
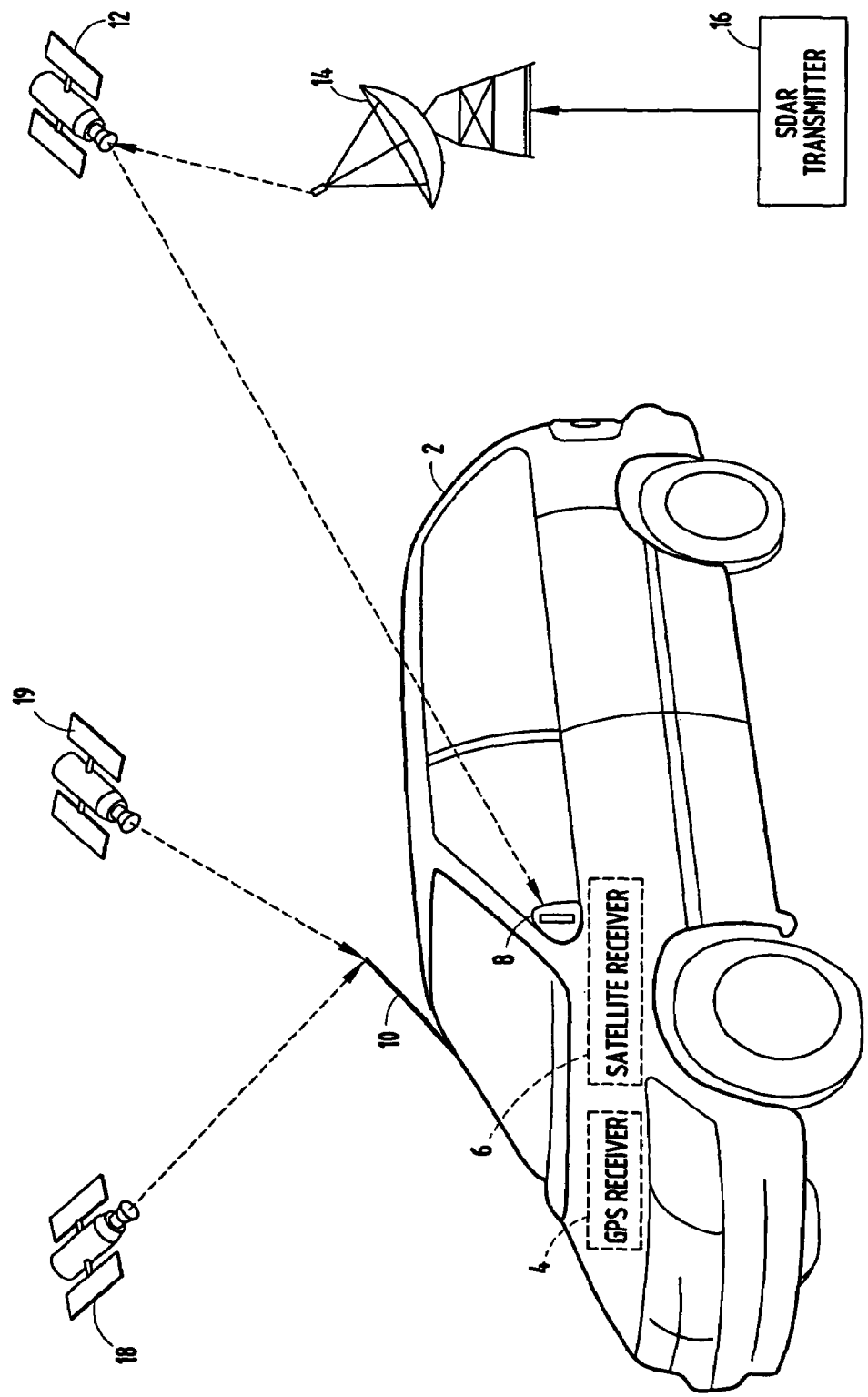
FIG. 2 is a schematic diagram generally illustrating GPS and satellite digital receiver systems employed in a vehicle, according to one embodiment of the present invention.

FIG. 2 generally illustrates a vehicle 2 including a GPS receiver 4 and satellite digital audio radio (SDAR) receiver 6. Vehicle 2 also includes a GPS antenna 10 coupled to GPS receiver 4, and a satellite digital audio radio (SDAR) antenna 8 electrically coupled to SDAR receiver 6. As shown, broadcast GPS signals are transmitted from GPS satellites 18 and 19 to GPS antenna 10 of vehicle 2. The received GPS signals are then provided from GPS antenna 10 to GPS receiver 4, where the signals received by antenna 10 are used by GPS receiver 4 to determine the location of vehicle 2. SDAR antenna 8 receives SDAR signals broadcast from SDAR satellite(s) 12. SDAR receiver 6 decodes the SDAR signals received via SDAR antenna 8, and extracts audio and/or data from the received signals. As shown, the SDAR signals provided to SDAR antenna 8 from SDAR satellite 12 are provided by a SDAR transmitter 16. SDAR transmitter 16 transmits SDAR signals via transmit antenna 14 to SDAR satellite 12. The signals are then provided by SDAR satellite 12 to SDAR antenna 8 of vehicle 2, and then to SDAR receiver 6 of vehicle 2.

Figure 3:
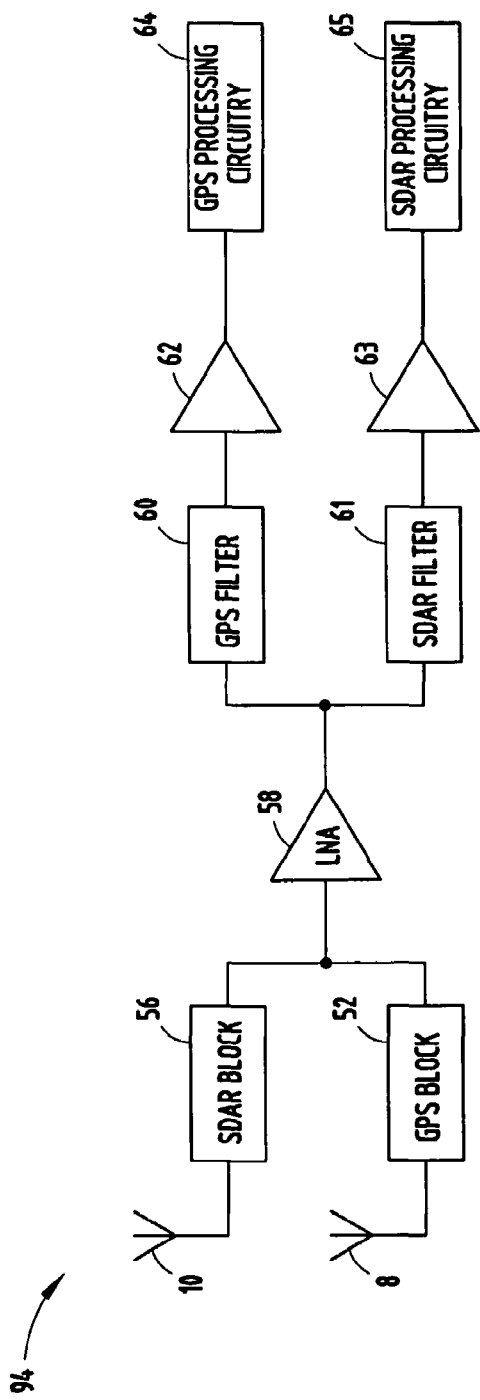
FIG. 3 is a block diagram generally illustrating a GPS and satellite digital receiver system sharing an amplifier according to one embodiment of the present invention.

FIG. 3 generally illustrates a GPS and satellite receiver system 94, according to one embodiment of the present invention. The system 94 includes an SDAR antenna 8 coupled to a GPS block 52. The SDAR antenna 8 is configured to receive SDAR signals, and provides those signals to GPS block 52. GPS block 52 is configured to remove or block signals that are present in the signals received via SDAR antenna 8 that are at frequencies other than SDAR frequencies, such that only SDAR signals are output from GPS block 52. In one exemplary embodiment, GPS block 52 blocks GPS signals.

System 94 also includes a GPS antenna 10 that is electrically coupled to SDAR block 56. GPS antenna 10 is configured to receive GPS signals, and provides those signals to SDAR block 56. SDAR block 56 is configured to block signals occurring at frequencies other than a GPS frequency range that are received by GPS antenna 10, or that may be induced in the circuitry coupling GPS antenna 10 to SDAR block 56. In one exemplary embodiment, SDAR block 56 is configured to block frequencies in the SDAR frequency range, such that only GPS signals are output from SDAR block 56.

The output signal of GPS block 52 is an SDAR signal received by SDAR antenna 8 that does not include GPS signals. The output signal of SDAR block 56 is a GPS signal received from GPS antenna 10 that does not include SDAR signals. The SDAR signal output of GPS block 52 and the GPS signal output of SDAR block 56 are combined together into a combined input signal which is provided to a low-noise amplifier 58. Low-noise amplifier 58 is configured to amplify the combined input signal received from GPS block 52 and SDAR block 56, such that the SDAR and GPS components of the combined input signal are amplified together. According to one embodiment, low-noise amplifier 58 is a two-stage amplifier that is noise-matched to both the GPS and SDAR frequencies.

As shown, low-noise amplifier 58 is electronically coupled to GPS filter 60 and SDAR filter 61. GPS filter 60 operates on the output signal from low-noise amplifier 58 to filter the signal, such that signals other than GPS signals are removed from the input signal. SDAR filter 61 operates on the input signal received from low-noise amplifier 58 to filter the signal, such that signals at frequencies other than SDAR signals are removed from the input signal. In the present embodiment, SDAR filter 61 is a ceramic filter, while GPS filter 60 is a surface acoustic wave (SAW) filter. The filters are configured such that they act as an open circuit for interfering frequency bands. More specifically, GPS filter 60 acts as an open circuit toward signals occurring at other than GPS frequencies, while SDAR filter 61 acts as an open circuit toward signals occurring at other than SDAR frequencies. GPS filter 60 is shown coupled to an amplifier 62.

The filtered GPS signal provided by GPS filter 60 is amplified by amplifier 62. This amplified signal is then provided to GPS processing circuitry 64, which is electronically coupled to amplifier 62. GPS processing circuitry 64 processes the GPS signal, and uses the signal information to determine the location of the GPS receiver and, hence, the location of the vehicle in which the GPS receiver is located. The filtered SDAR signal provided by SDAR filter 61 is provided to amplifier 63, which is electronically coupled to SDAR filter 61. The amplified SDAR signal provided as an output of amplifier 63 is provided to SDAR processing circuitry 65, which is electronically coupled to the output of amplifier 63. SDAR processing circuitry 65 processes the amplified SDAR signal to extract audio and/or data, and processes the audio and/or data, such that it can be used by users of the SDAR system.

In this manner, both GPS and SDAR signals received by antennas 10 and 8, respectively, are initially amplified by the same low-noise amplifier 58 before being provided to additional processing circuitry for the extraction of GPS, audio, and/or other data. It should be appreciated that GPS block 52 and/or SDAR block 56 may be implemented using discrete components, microstrip lines, or other conventional filter construction techniques. In an alternate embodiment, the system 94 includes current sense circuitry configured to terminate the GPS branch of the circuitry when a GPS antenna is not connected to the system 94.

Figure 4:
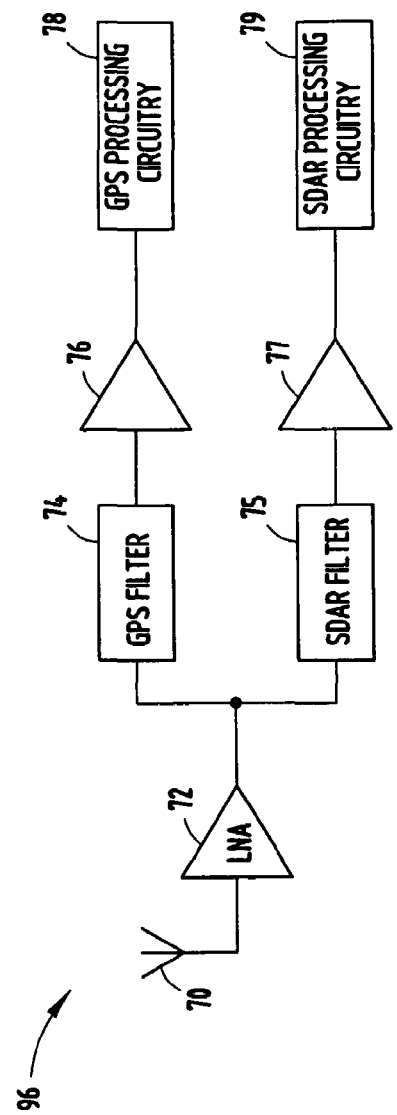
FIG. 4 is a block diagram generally illustrating a GPS and satellite digital receiver system sharing an amplifier according to another embodiment of the present invention.

FIG. 4 generally illustrates a GPS and SDAR system 96, according to another embodiment of the present invention. According to the present embodiment, both GPS and SDAR signals are received via a single antenna 70. The received GPS and SDAR signals are provided to a low-noise amplifier 72, where GPS and SDAR components of the received signals are amplified. The amplified GPS and SDAR signals are provided from the output of low-noise amplifier 72 to a GPS filter 74. GPS filter 74 acts to filter signal components other than GPS signal components from the signal received from low-noise amplifier 72. GPS filter 74 then provides the filtered GPS signal to an amplifier 76 that is electrically coupled to GPS Filter 74. Amplifier 76 provides an amplified filtered GPS signal to GPS processing circuitry 78, which is electrically coupled to amplifier 76. GPS processing circuitry 78 processes the received GPS signal to determine the location of a GPS receiver and the vehicle in which it is located. SDAR filter 75 operates to filter the GPS and SDAR signals received from low-noise amplifier 72, such that all but the SDAR signals are filtered from the input signal by SDAR filter 75. The SDAR filtered signals are provided by SDAR filter 75 to amplifier 77 for amplification. Amplifier 77 provides the amplified SDAR signals to SDAR processing circuitry 79 that is electrically coupled to amplifier 77. SDAR processing circuitry 79 processes the filtered and amplified SDAR signals to extract audio and/or data, and process the audio and/or data to provide it as output to SDAR system users.

In this manner, SDAR and GPS signals received by a single antenna 70 are amplified by a single low-noise amplifier 74 before being provided to additional processing circuitry for extracting and processing GPS and SDAR signals. It should be appreciated that in other embodiments, satellite audio signals other than SDAR signals may be processed in the systems generally illustrated in FIGS. 3 and 4.

Figure 5:
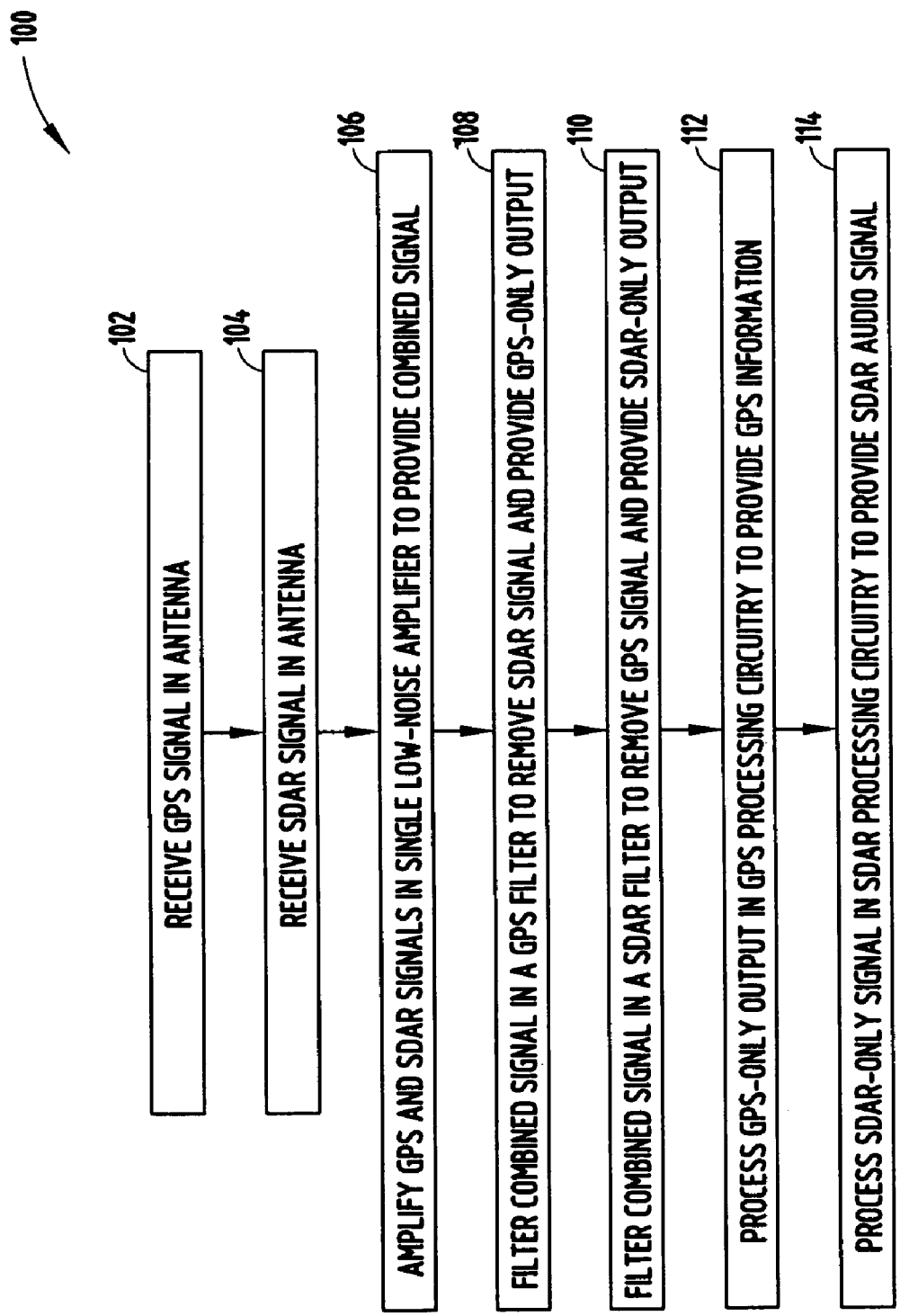
FIG. 5 is a flow diagram generally illustrating a method for processing GPS and satellite digital radio signals using a shared amplifier, according to one embodiment of the present invention.

FIG. 5 generally illustrates a method for processing GPS and satellite digital audio radio (SDAR) signals received by SDAR and GPS systems, according to one embodiment of the present invention. In a first step 102 of the method 100, GPS signals are received in an antenna. In a second step 104 of the method 100, SDAR signals are received in an antenna. In a third step 106 of the method 100, both the GPS and SDAR signals are amplified by a shared low-noise amplifier to provide an amplified combined SDAR GPS signal. In a fourth step 108 of the method 100, the combined signal is filtered in a GPS filter to remove SDAR signals, and provides a GPS only output signal. In a fifth step 110 of the method 100, the combined signal is filtered in an SDAR filter to remove GPS signals, and provides an SDAR only output. In a sixth step 112 of the method 100, the GPS only output signal is processed in GPS processing circuitry to provide GPS information. In a seventh step 114 of the method 100, the SDAR only output signal is processed in SDAR processing circuitry to extract audio and/or other SDAR data. It should be appreciated that in an alternate embodiment, satellite audio signals other than SDAR signals are received in an antenna and amplified along with GPS signals by a shared low-noise amplifier.

The embodiments of the present invention described above advantageously provide for systems and a method for amplifying GPS and SDAR signals in a shared low-noise amplifier prior to providing the signals to SDAR and GPS processing circuitry for the processing of GPS signals, and the extraction of audio and/or data from the SDAR signals. The system advantageously employs a reduced number of circuit components to allow reduced size and cost of the systems.

The above description is considered that of the preferred embodiments only. Modifications of the invention will occur to those skilled in the art, and to those who make or use the invention. Therefore, it is understood that the embodiments shown in the drawings and described above are merely for illustrative purposes, and not intended to limit the scope of the invention, which is defined by the following claims, as interpreted according to the principles of patent law, including the doctrine of equivalents.

The invention claimed is:

1. A system for processing GPS and satellite digital radio signals, comprising:

an SDAR antenna configured to receive satellite digital radio signals, said SDAR antenna coupled to an input of a GPS block including circuitry operative to throughput satellite digital radio signals without GPS signal components;

a GPS antenna configured to receive signals transmitted by a GPS satellite coupled to an input of an SDAR block including circuitry operative to throughput GPS signals without satellite digital radio signal components;

a low noise amplifier having a single input electrically coupled to both an output of said GPS block and an output of said SDAR block, wherein said amplifier is configured to amplify both GPS signals received by said GPS antenna, and satellite digital radio signals received by said SDAR antenna, and provide a single, amplified signal at a low noise amplifier output comprising both satellite digital radio and GPS signal components:

a SDAR filter including an input electrically coupled to said low noise amplifier output, said SDAR filter including circuitry operative to filter the low noise amplifier output signal such that signals other than SDAR signals are removed and remaining SDAR signals are provided to a SDAR filter output;

a GPS filter including an input electrically coupled to said low noise amplifier output, said GPS filter including circuitry operative to filter the low noise amplifier output signal such that signals other than GPS signals are removed and remaining GPS signals are provided to a GPS filter output;

a SDAR amplifier including an input electrically coupled to said SDAR filter output, said SDAR amplifier operative to amplify the remaining SDAR signals received from said SDAR filter;

a GPS amplifier including an input electrically coupled to said GPS filter output, said GPS amplifier operative to amplify the remaining GPS signals received from said GPS filter;

SDAR processing circuitry including an input electrically coupled to an SDAR amplifier output, said SDAR processing circuitry operative to receive the remaining SDAR signals receiver from said SDAR amplifier, to extract audio and/or data content from said remaining SDAR signals, and to output said audio/data to a user; and GPS processing circuitry including an input electrically coupled to an GPS amplifier output, said GPS processing circuitry operative to receive the remaining GPS signals receiver from said GPS amplifier, to calculate the geographical position of the system from said remaining GPS signals, and to output a signal indicative of geographical position to a user.

2. The system of claim 1, wherein said amplifier is a low-noise amplifier that is noise matched to GPS signals and satellite digital radio signals.

* * * * *